Dec. 4, 1934.  W. D. KENNEDY  1,983,378
VALVE GEAR SERVICING DEVICE
Filed Feb. 9, 1933
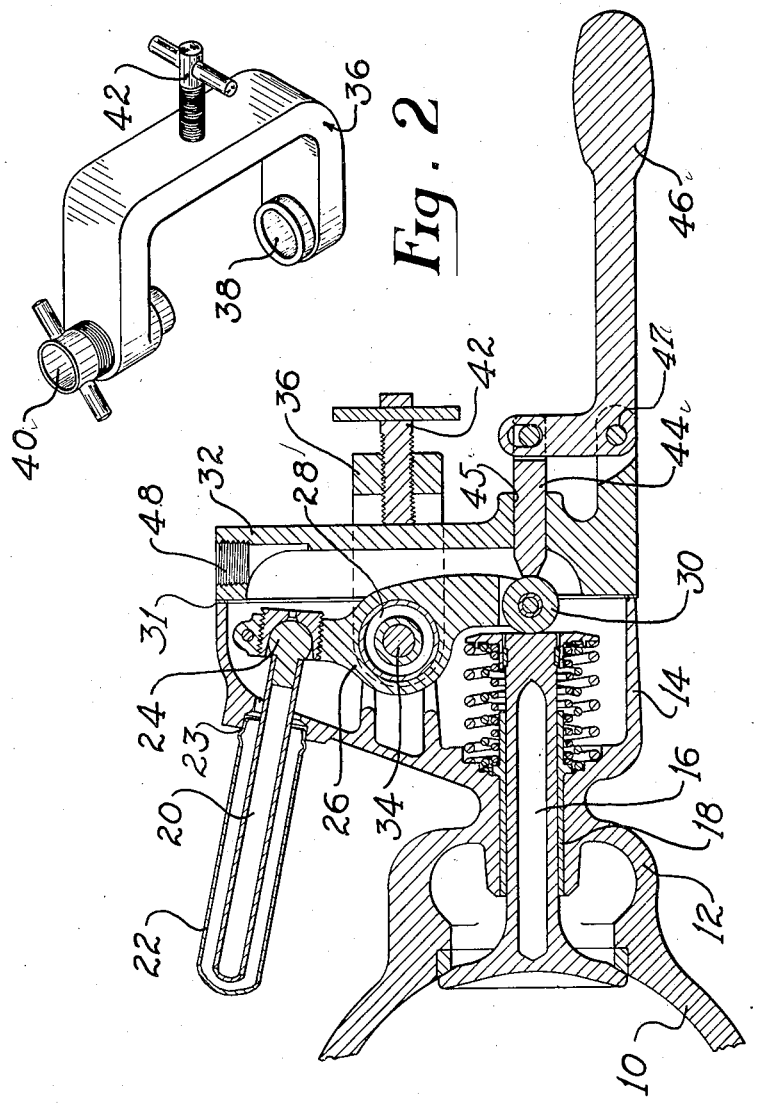
INVENTOR
WILLIAM D. KENNEDY
BY
ATTORNEY Patented Dec. 4, 1934

1,983,378

UNITED STATES PATENT OFFICE 1,983,378

VALVE GEAR SERVICING DEVICE

William D. Kennedy, Clifton, N. J., assignor to Wright Aeronautical Corporation, a corporation of New York Application February 9, 1933, Serial No. 655,944

5 Claims. (Cl. 184—1)

This invention relates to servicing tools for engines, and has for a specific object the provision of means for lubricating and rust-proofing inaccessible portions of the valve mechanism of internal combustion engines.

One of the service problems encountered in internal combustion engine maintenance and shipment is the relative difficulty in properly rust-proofing certain reciprocating parts of the engine. It is well known that bright metal, particularly ferrous metal, surfaces must be coated with a layer of oil, grease or special slushing compound when such parts lie idle for a considerable period, as, for instance, when the equipment is in storage, or in shipment. Particularly when being shipped by water, protection must be applied to the metal parts to avoid corrosion.

This invention relates specifically to devices for applying rust-proofing compounds, oil or grease to the valve stems and valve guides of that type of internal combustion engine in which the valve mechanism is at the outer cylinder ends, and which in service is lubricated by the application of oil or grease within a closed housing surrounding the upper end of the valve, the valve springs and valve operating mechanism. It is, of course, relatively simple to lubricate or slush the exposed mechanism within the housing, but difficulty is experienced in completely covering the hidden valve stem and the hidden guide within which the stem is held for reciprocation. This operation could, of course, be effected by disassembly of the parts, or by turning the crankshaft while the valve housing is filled with lubricant under pressure, but such processes are arduous, and hence, expensive.

An object, then, of the invention is to provide easily operated means for externally reciprocating an engine part while applying grease under pressure thereto.

A further object is to provide a portable and inexpensive service tool to assist in preparing engines for storage and shipment.

Another more specific object is to provide a dummy cover for a valve mechanism housing, such cover being equipped with means for externally reciprocating a valve, and having an opening through which grease or rust-resistant compound may be introduced under pressure to protect the valve stem and its guide.

A further object is to provide a quick-operating clamp for holding such dummy cover in place on the valve mechanism housing.

Further objects will be apparent from a reading of the annexed specification and claims, and from a consideration of the drawing, in which:

Fig. 1 is a section through the upper cylinder, valve housing, rocker box and rocker mechanism of an internal combustion engine of the overhead valve type, and on which the device of the invention is attached for operation; and Fig. 2 is a perspective view of the clamp for attaching the device to the engine.

A brief description of that part of an engine to which the device of my invention is applicable will be given, to clarify its objectives and applicability. A cylinder head 10, having a valve port housing 12 supporting a rocker box 14 is equipped with a valve 16, adapted to reciprocate within a valve guide 18 fixed in the upper portion of the valve port housing 12. An outer portion of the rocker box 14 is provided with an opening through which a pushrod 20 is adapted to pass, said pushrod being enclosed in an oil-tight housing 22 fitting within a recess 23 in the rocker box. An upper ball end 24 of the pushrod 20 engages a rocker arm 26 carried on a pivot 28, the opposite end 30 of the rocker arm bearing on the top of the valve 16 for the operation thereof. Normally, the upper open planar face 31 of the rocker box 14 is provided with a cover, not shown, which forms an oil-tight closure therefor.

In place of such cover, the device of my invention is shown in its installed position on the face 31 of the rocker box 14. The device comprises a housing 32, forming a complete closure over the open rocker box 14. Temporary firm attachment of the housing may be effected by a U-shaped clamp 36, one leg of the U having a recessed ferrule 38 adapted to engage an end of a rocker arm bolt 34 which protrudes permanently on either side of the box 14. The other leg of the U is provided with a screw ferrule 40, which engages the other end of the rocker bolt 34 to hold the clamp 36 firmly in place. A screw 42 is threaded into the intermediate portion of the clamp 36, and when tightened against the housing 32, holds it firmly in place on the rocker box 14.

Means are provided as part of the housing 32 for externally reciprocating the valve 16 in its guide 18, comprising a plunger 44, reciprocable in a guide 45 formed in the housing 32. The inner end of the plunger 44 engages the valve end 30 of the rocker arm 36, so that by reciprocating the plunger, the valve is likewise reciprocated. A bell crank or lever 46, pivoted at 47 to the housing 32 engages the outer end of the plunger 44 for easy operation thereof. The housing 32 is provided with a threaded opening 48, in which the fitting of any well known suitable grease gun or slushing compound applicator may be inserted.

In operation, the normal rocker box cover is removed and the device is placed on the rocker box 14, after which it is clamped thereto by the clamp 36. Grease or slushing compound is fed into the rocker box through the opening 48, and the lever 46 is oscillated. This allows the grease to work down the valve stem 16 and the guide 18, properly coating them for resistance to corrosion. Some grease is also forced within the pushrod housing 22, but by the conventional closures provided in connection with such parts, the pressure on the grease within the rocker box does not force it into the balance of the engine. Oscillation of the rocker arm also allows the grease to adequately coat the pushrod end 24 and its socket, and those parts comprising the oscillating bearings for the rocker arm 26, such as 28 and 30.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. Means for introducing rust preventive compounds within an engine including a tight cover adapted to be clamped to said engine, said cover having an opening through which the compound is introduced, and means externally manually operable to move certain of said engine parts while said compound is introduced within said cover.

2. Means for lubricating an engine valve gear including a detachable cover having an opening for the introduction of lubricant, and an externally manually operable device carried by said cover for moving parts of said valve gear while lubricant is being fed thereto.

3. In servicing tools for engines, means for retaining lubricant in proximity to certain parts of said engine, and a device carried by said means and manually externally operable for moving parts of said engine.

4. A device for servicing the valve gear of an engine with lubricant comprising means adapted to be quickly secured in place of the normal valve gear cover, said means having a device for reciprocating the valve while lubricant is being introduced.

5. A detachable cover for a mechanism having relatively movable parts therein, said cover having an opening for introduction of lubrication to said mechanism, and manual means passing through and movable with respect to said cover, said means engaging certain of the relatively movable mechanism parts, whereby said mechanism parts may be relatively moved while lubrication is fed thereto through said opening.

WILLIAM D. KENNEDY.